United States Patent [19]

Grosu et al.

[11] 4,185,217

[45] Jan. 22, 1980

[54] THREE POLE ELECTRIC MOTOR

[75] Inventors: Stefan Grosu, Bucharest; Vasile Preda, Comuna Domnesti, both of Romania

[73] Assignee: Institutul de Cercetare si Proiectare Pentru Industria Electrotehnica, Bucharest, Romania

[21] Appl. No.: 587,701

[22] Filed: Jun. 17, 1975

[51] Int. Cl.² .............................................. H02K 3/00
[52] U.S. Cl. ..................................... 310/185; 310/72
[58] Field of Search ................. 310/172, 72, 185, 166, 310/190, 162, 254, 258, 259; 318/220, 221, 222, 225, 228

[56] References Cited

U.S. PATENT DOCUMENTS

| | | | |
|---|---|---|---|
| 2,121,550 | 6/1938 | Nyman | 318/220 |
| 2,466,591 | 4/1949 | Jacobson | 310/172 |
| 2,567,976 | 9/1951 | Spinasse | 310/222 |
| 3,036,255 | 5/1962 | Lewus | 318/221 |
| 3,257,572 | 6/1966 | Ludemann | 310/190 |
| 3,358,165 | 12/1967 | Grosu | 310/185 |
| 3,403,272 | 9/1968 | Dold | 310/162 |
| 3,599,023 | 8/1971 | Bottrell | 310/72 |
| 3,716,734 | 2/1973 | Fam | 310/72 |

*Primary Examiner*—R. Skudy
*Attorney, Agent, or Firm*—Karl F. Ross

[57] ABSTRACT

A three pole electric motor has three poles spaced from the armature of the motor by an air gap and extending around the air gap, each pole being formed with a column, the three columns being parallel and connected at their ends remote from the armature. A first coil is wound upon one of the outer columns and is connected to a single-phase alternating current source while a second coil is wound upon the other outer column and is tapped across a portion of the first coil in series with a condenser.

1 Claim, 2 Drawing Figures

THREE POLE ELECTRIC MOTOR

FIELD OF THE INVENTION

The invention relates to an alternating current motor supplied with a single phase and having three poles and two coils, a condenser being provided in the circuit of one of the two coils.

BACKGROUND OF THE INVENTION

It is known to provide an electric single-phase motor with three magnetic poles and two coils, one of the coils being directly connected to a single-phase alternating current supply while the other coil is connected to the same supply in circuit with a condenser. This condenser requires complex connections and makes the dimensions of the coil in circuit with the condenser depend upon the supply voltage.

OBJECT OF THE INVENTION

It is the object of the invention to provide an improved three-pole, two-coil single-phase energized alternating current motor.

SUMMARY OF THE INVENTION

According to this invention a motor with three poles has one of its coils connected to the alternating current supply system and a second coil tapped across a portion of the first coil in circuit with a capacitor or merely bridged by the capacitor.

SPECIFIC DESCRIPTION

Figure 1:
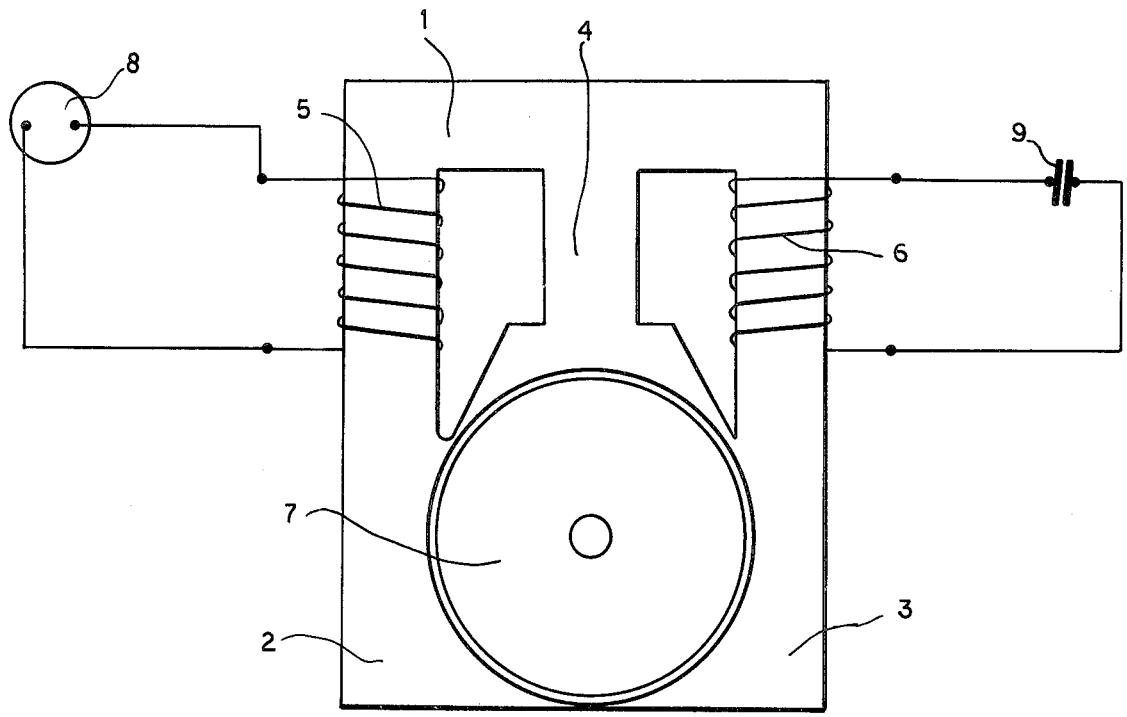
FIG. 1 is a diagram of one connection arrangement of a motor according to the invention.

The motor according to the invention comprises a magnet-core stator 1 provided with only three poles, 1, 3, 4 extending all around and with air-gap spacing from a cage-type rotor 7. The two poles 2 and 3 each is formed with a respective outer column of the stator while the pole 4 is formed with a central stator, the three columns being parallel to one another and bridged at their ends remote from the rotor. The coil 5, wound upon one of the outer columns is connected across the terminals of a single-phase alternating current supply source 8.

In the embodiment of FIG. 1, the terminals of the other coil 6, wound upon the other outer column, are bridged directly by a capacitor 9 without any galvanic connection to the source 8.

Figure 2:
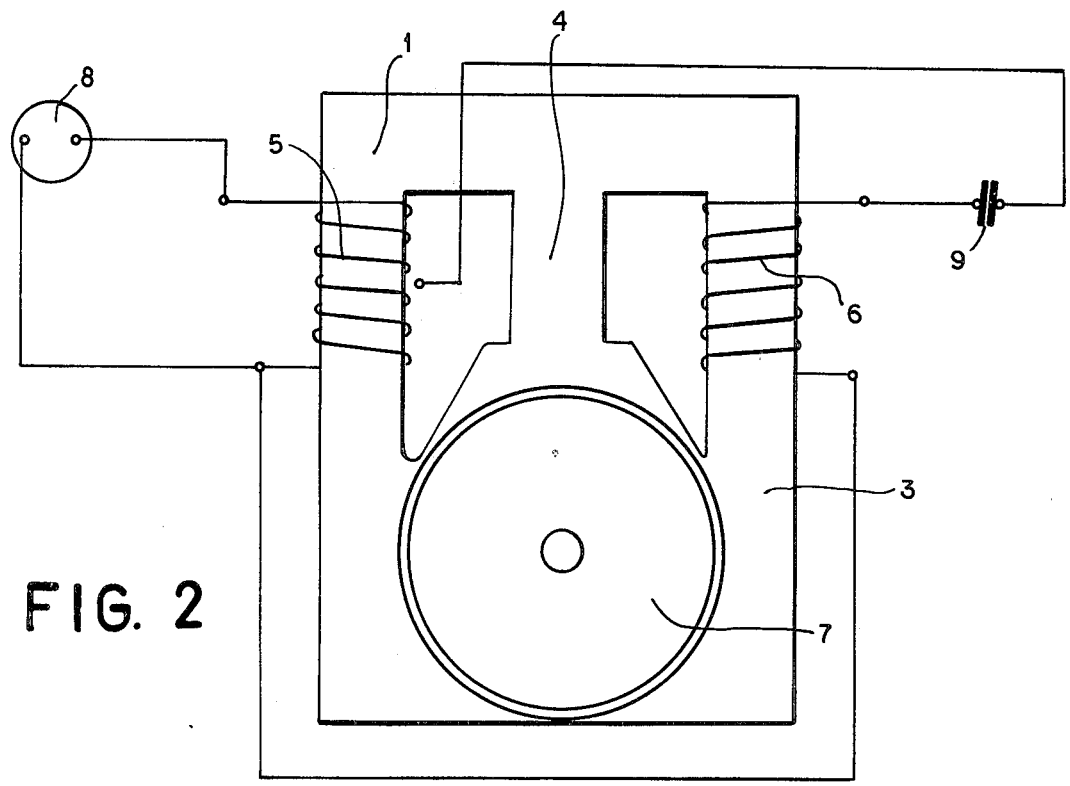
FIG. 2 is a diagram illustrating a second connection arrangement of the motor according to the invention.

In the embodiment of FIG. 2, however, the coil 6 is taped across a portion of the coil 5 in circuit with the capacitor 9.

In the embodiment of FIG. 1, the flux induced in the core 1 by the coil 5 is split through the central column and the outer column and induces a current in coil 6 provided with the capacitor 9.

Because of the shape of the magnetic core 1, the leakage reactants of the coils (including coil 6) is relatively large so that the circuit may reach a resonance or ferroresonance condition. The capacitor 9 dephases the current in the circuit including coil 6 so that the fluxes induced by the coils 5 and 6 are out of phase. The out-of-phase fluxes are superimposed on the central column to produce a resultant third phase whereby the stator is magnetically energized in a tri-phasal system, the first phase of which is the flux phase induced by coil 5, the second phase of which is the shifted phase of coil 6 and the third phase of which is the superimposed phases of pole 4. The resulting rotating field in the air gap drives the rotor 7. The three pole motor may have the parallel columns illustrated although it is possible that the columns are tilted at 120° to one another.

The invention is advantageous because of the simplified connection and because it enables the second coil 6 to be dimensioned independently of the supply voltage.

We claim:

1. A three-pole electric motor comprising:
   a stator;
   a rotor rotatable relative to said stator, said stator being formed with only three poles disposed around said rotor and forming an air gap therewith, each of said poles being provided with a respective column extending away from said rotor, said columns being parallel to one another and including a pair of outer columns and an inner column, said columns being magnetically interconnected at their ends remote from said rotor;
   a first coil wound on one of said outer columns and directly energized by a single-phase alternating-current supply source;
   a second coil wound upon the other of said outer columns; and
   a capacitor in circuit with said second coil, said capacitor being connected in series with said second coil across only a portion of said first coil.

* * * * *